(12) United States Patent
Chaubet et al.

(10) Patent No.: US 11,485,634 B2
(45) Date of Patent: Nov. 1, 2022

(54) PLANT AND METHOD FOR GENERATION OF SYNTHESIS GAS

(71) Applicant: L'Air Liquide, Societe Anonyme pour l'Etude et l'Exploitation des Procedes Georges Claude, Paris (FR)

(72) Inventors: Lucie Chaubet, Frankfurt am Main (DE); Frederic Bonne, Paris (FR); Camille Bouet, Eaunes (FR); Holger Schlichting, Hofheim (DE); Marc Wagner, Saint Maur des Fosses (FR)

(73) Assignee: L'Air Liquide, Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 634 days.

(21) Appl. No.: 16/467,668

(22) PCT Filed: Nov. 20, 2017

(86) PCT No.: PCT/EP2017/025340
§ 371 (c)(1),
(2) Date: Jun. 7, 2019

(87) PCT Pub. No.: WO2018/103891
PCT Pub. Date: Jun. 14, 2018

(65) Prior Publication Data
US 2020/0087143 A1 Mar. 19, 2020

(30) Foreign Application Priority Data
Dec. 9, 2016 (EP) .................................. 16400057

(51) Int. Cl.
*C01B 3/36* (2006.01)
*B01D 53/14* (2006.01)
(Continued)

(52) U.S. Cl.
CPC ............ *C01B 3/36* (2013.01); *B01D 53/1462* (2013.01); *B01D 53/1493* (2013.01);
(Continued)

(58) Field of Classification Search
CPC .... C01B 3/36; C01B 3/02; C01B 3/52; C01B 2203/0233; C01B 2203/0261;
(Continued)

(56) References Cited

U.S. PATENT DOCUMENTS

2010/0018216 A1   1/2010 Fassbender
2012/0227442 A1*  9/2012 Russ ...................... C10K 1/005
                                                                    62/640

FOREIGN PATENT DOCUMENTS

DE   10 2005 046790       4/2007
EP   0 556 691            8/1993
(Continued)

OTHER PUBLICATIONS

International Search Report and Written Report for PCT/EP2017/025340, dated Feb. 22, 2018.

*Primary Examiner* — Steven J Bos
*Assistant Examiner* — Syed T Iqbal
(74) *Attorney, Agent, or Firm* — Justin K. Murray

(57) ABSTRACT

Method and plant for generation of synthesis gas, comprising the steps of air fractionation to give oxygen, nitrogen and tail gas, gasification of a hydrocarbonaceous fuel to give crude synthesis gas and cleaning of the crude synthesis gas by removal of acid gas by means of cryogenic absorption, wherein the absorbent is cooled by means of a compression coolant circuit and the cooling water used is cooled by evaporative cooling by means of the tail gas obtained in the air fractionation.

4 Claims, 2 Drawing Sheets

(51) Int. Cl.
  *B01D 53/18* (2006.01)
  *C01B 3/02* (2006.01)
  *C01B 3/52* (2006.01)
  *C10K 1/00* (2006.01)
  *F25J 3/04* (2006.01)

(52) U.S. Cl.
  CPC ............... *B01D 53/18* (2013.01); *C01B 3/02* (2013.01); *C01B 3/52* (2013.01); *C10K 1/004* (2013.01); *C10K 1/005* (2013.01); *F25J 3/04545* (2013.01); *F25J 3/04563* (2013.01); *B01D 2252/2021* (2013.01); *C01B 2203/0233* (2013.01); *C01B 2203/0261* (2013.01); *C01B 2203/0415* (2013.01); *C01B 2203/0475* (2013.01); *C01B 2203/0485* (2013.01); *C01B 2203/1241* (2013.01); *F25J 2205/34* (2013.01); *F25J 2240/12* (2013.01); *F25J 2260/44* (2013.01)

(58) Field of Classification Search
  CPC .... C01B 2203/0415; C01B 2203/0475; C01B 2203/0485; C01B 2203/1241; C01B 3/506; C01B 3/50; B01D 53/1462; B01D 53/1493; B01D 53/18; B01D 2252/2021; B01D 53/14; C10K 1/004; C10K 1/005; F25J 3/04545; F25J 3/04563; F25J 2205/34; F25J 2240/12; F25J 2260/44; F25J 3/04; C10J 2300/165
  See application file for complete search history.

(56) References Cited

FOREIGN PATENT DOCUMENTS

| | | |
|---|---|---|
| EP | 2 292 554 | 3/2011 |
| EP | 2 498 033 | 9/2012 |
| WO | WO 2004/089499 | 10/2004 |

\* cited by examiner

PLANT AND METHOD FOR GENERATION OF SYNTHESIS GAS

CROSS REFERENCE TO RELATED APPLICATIONS

This application is a § 371 of International PCT Application PCT/EP2017/025340, filed Nov. 20, 2017, which claims the benefit of EP16400057.2, filed Dec. 9, 2016, both of which are herein incorporated by reference in their entireties.

FIELD OF THE INVENTION

The invention relates to a method of generating a synthesis gas which consists mainly of carbon monoxide and hydrogen and has been freed of acid gases, proceeding from a hydrocarbonaceous fuel, and also air and steam, comprising the following method steps:
- fractionating air by low-temperature rectification to give an oxygen stream, a tail gas stream and a nitrogen stream, wherein the tail gas stream and the nitrogen stream are at ambient temperature and the nitrogen stream is at elevated pressure,
- converting a hydrocarbonaceous fuel at elevated pressure and elevated temperature with the oxygen stream and the steam, by a method known to those skilled in the art, to a synthesis gas,
- removing the acid gases from the synthesis gas by low-temperature absorption in an absorption column with a liquid absorbent,
- cooling the absorbent used to the low temperature needed for the low-temperature absorption by means of a compression refrigeration plant, wherein the compression refrigeration plant comprises a coolant circuit in which the coolant is compressed and the heat of compression transferred to the coolant is removed again from the coolant by subsequent heat exchange with cooling water,
- cooling the cooling water before it exchanges heat with the coolant by evaporative cooling.

The invention likewise encompasses a plant for conducting the method.

BACKGROUND OF THE INVENTION

The methods underlying the invention (cryogenic air fractionation, generation of synthesis gas from a carbonaceous fuel and cryogenic separation of acid gas from the (crude) synthesis gas) form part of the prior art.

Cryogenic air fractionation, also called low-temperature fractionation, has been known since the 1920s and is described in principle, for example, in Ullmann's Encyclopedia of Industrial Chemistry, 6th Edition, vol. 10, p. 39, 40. In connection with synthesis gas production, the known air fractionation methods frequently make use of two-column rectification since this also generates, as well as the oxygen stream, a stream of pure nitrogen which can frequently be used in plants connected downstream of the synthesis gas production. One design of two-column rectification which is frequently used for synthesis gas production is described in the textbook "Gasification", Second Edition, Christopher Higman, Maarten van der Burgt, Gulf Professional Publishing, Elsevier, Burlington, USA.

In this design, the air stream sucked in from the environment is compressed and subjected to a preliminary purification in which moisture and long-chain hydrocarbon molecules are removed in an adsorption step and then carbon dioxide and the remaining hydrocarbons are removed by means of molecular sieve. The air stream thus treated is then made to exchange heat with the product streams (oxygen, nitrogen and tail gas) leaving the two-column rectification.

The heat exchange is conducted until the compressed air is cooled down to its condensation temperature and the product streams are warmed up to ambient temperature. This method is frequently conducted in such a way that the nitrogen product stream, after the exchange of heat and the simultaneous warming to room temperature, has an elevated pressure of about 5-6 bar. This nitrogen can be used as utility for other plants or, for example after expansion and cooling, for preliminary cooling of the air for the air fractionation plant.

The oxygen produced in the air fractionation is subsequently, together with a stream of steam, used for conversion, also called gasification, of a hydrocarbonaceous fuel to give synthesis gas consisting mainly of hydrogen and carbon monoxide. The fuel used is frequently coal, coke or natural gas, but also liquid hydrocarbons or biomass. A multitude of methods and reactor types have been developed for the respective fuels. An overview of these gasification methods is also given, for example, by the abovementioned textbook "Gasification".

In principle, all these gasification methods are usable for the present invention.

For the further use of the synthesis gas, as a raw material for the production of methanol, ammonia or hydrogen, for example, or as fuel gas, it is necessary to separate carbon dioxide and hydrogen sulfide, often referred to collectively as acid gases, therefrom. This is very effectively accomplished by a low-temperature absorption method, in which methanol cooled down to a low temperature is used as absorbent. This method has been known by the name "Rectisol process" since the 1950s. A description is given, for example, in Ullmann's Encyclopedia of Industrial Chemistry, 6th edition, vol. 15, p. 399 ff. The acid gases are scrubbed out of the cryogenic methanol here in a column, in countercurrent. In what is called the standard Rectisol process, both acid gases, carbon dioxide and hydrogen sulfide, are scrubbed out in a column. The synthesis gas to be scrubbed enters the column at the base, mainly hydrogen sulfide is scrubbed out in the lower portion of the column and then, in the upper portion, mainly carbon dioxide is scrubbed out. In the regeneration of the methanol, the acid gases are obtained as a gas mixture and removed for further treatment. For the case of intending to obtain carbon dioxide and hydrogen sulfide separately, what is called the selective Rectisol method was developed. In this method, the synthesis gas to be cleaned flows through two scrubbing or absorption columns arranged in succession. Hydrogen sulfide is removed in the first, carbon dioxide in the second. The gases are thus kept separate and can then each be driven out of the laden methanol. For the present invention, it is possible to use both the standard and the selective Rectisol methods. The low temperature of the methanol required for the method is established by withdrawing a laden methanol stream which has been heated by the absorption from the absorption column, cooling it by heat exchange with a cooling medium and then feeding it back into the column. The cooling medium used is frequently ammonia, which is cooled down correspondingly in a compression cooling plant The compression energy transferred to the cooling medium in the compression cooling plant leads to heating of the cooling medium. By heat exchange with cooling water, this heat is removed again from the cooling medium. The cooling water itself, before the exchange of heat with the cooling medium, is cooled by evaporative cooling.

The method entails high expenditure of electrical energy, especially in the steps of production of the gasifying agent by air fractionation and removal of the acid gas, for example for the compression of air for the air fractionation and the compression of the coolant in the compression cooling plant for refrigeration of the absorbent.

The problem addressed by the invention is therefore that of providing a variant of the method having lower consumption of electrical energy for operation thereof.

SUMMARY OF THE INVENTION

The problem is solved by a method and a plant according to the features of various embodiments described herein.

The first step of the method of the invention, the air fractionation, produces, as a by-product or waste product, with a high level of apparatus complexity and energy expenditure, high-pressure nitrogen and a tail gas stream. These streams are completely dry, and the invention makes use of their resultant particularly good absorption capacity for moisture in that it uses these streams for the evaporative cooling of the cooling water required for the compression refrigeration plant of the Rectisol plant. By comparison with the use of ambient air, which almost always contains a certain moisture content, it is possible to achieve a lower cooling water temperature and hence, in turn, a lower temperature of the coolant. The compression results in heating of the coolant in the coolant circuit, and it is subsequently cooled again by heat exchange with cooling water. The advantage of the invention is that the low temperature of the coolant needed for the cooling of the absorbent for the Rectisol plant can be accomplished with a lower pressure in the condensation of the coolant. The consumption of electrical energy for compression of the coolant is lowered by the invention.

The cooling water which is cooled in the evaporative cooler is fed to the method or to the plant from the outside, for example from a cooling water supply system which is not part of the scope of the invention, and, after use, recycled back to it from the plant according to the invention.

In the evaporative cooler, the cooling water is contacted with the tail gas stream and/or the expanded nitrogen stream. It is possible here to use means known to those skilled in the art, such as structured packings or random packings.

A preferred configuration of the invention is characterized in that the nitrogen stream generated by air fractionation, before it is used for evaporative cooling of the cooling water, is expanded by means of a turbine, cooled simultaneously, and then used to cool the coolant in the coolant circuit of the compression refrigeration plant. In this way, the pressure potential present in this stream is also exploited to support the compression refrigeration plant, and the energy expenditure for the compression is lowered.

BRIEF DESCRIPTION OF THE DRAWINGS

Developments, advantages and possible uses of the invention are also apparent from the description of non-limiting working and numerical examples and of the drawings which follows. All the features described and/or shown in images, alone or in any combination, form the invention, irrespective of the way in which they are combined in the claims or the dependency references therein.

The figures show.

DETAILED DESCRIPTION OF THE INVENTION

Figure 1:
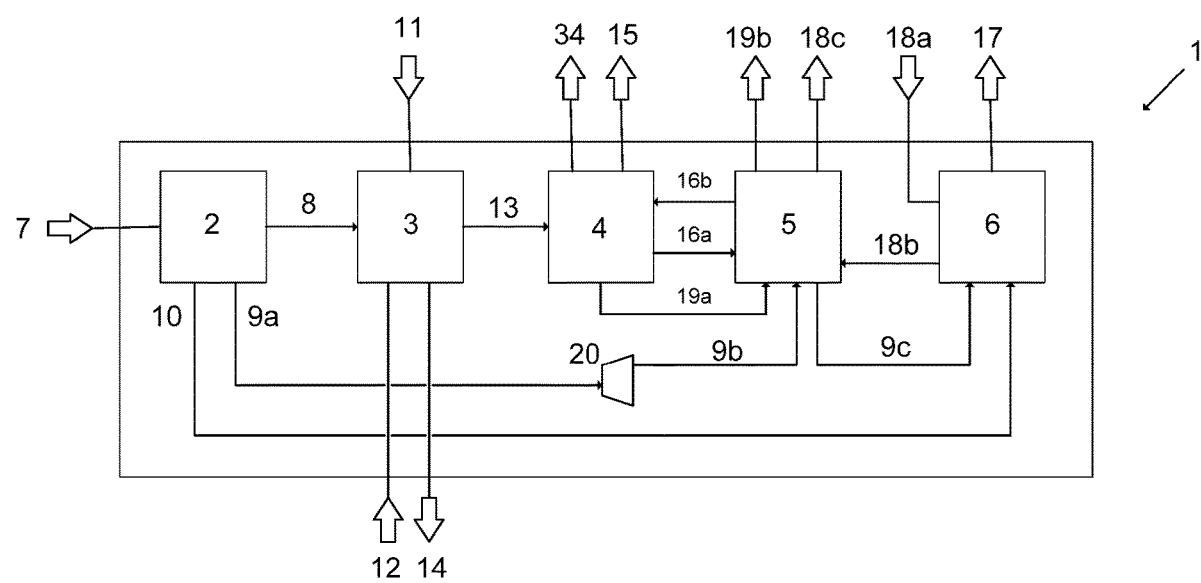
FIG. 1: block diagram of the plant according to the invention.

In FIG. 1, the plant 1 according to the invention comprises the component plants of cryogenic air fractionation 2, gasification 3, Rectisol plant 4, compression refrigeration plant 5 and the evaporative cooling plant 6. Air 7 is sucked in from the environment and fractionated in the air fractionation 2 into an oxygen stream 8, a nitrogen stream 9a and a tail gas stream 10. The gasification plant 3 is supplied with carbonaceous fuel 11, and it is converted therein with the oxygen stream 8 and steam 12 supplied to the plant to crude synthesis gas 13 and ash 14. The crude synthesis gas 13 generated is fed to the Rectisol plant 4, where the acid gases hydrogen sulfide 34 and carbon dioxide 19 are removed by cryogenic absorption with methanol as absorbent. The hydrogen sulfide removed is discharged from the plant 1 as stream 34 and the cleaned synthesis gas as stream 15 for further treatment. The carbon dioxide 19a removed is used for cooling in the coolant circuit of the compression refrigeration plant 5 and then discharged from the plant as stream 19b for further use or disposal. The methanol absorbent used in the Rectisol plant 4 is heated in the course of its use and therefore has to be cooled continuously. A stream of heated methanol 16a is guided into the compression refrigeration plant 5, cooled therein, and conducted back into the Rectisol plant 4 as stream 16b. The cooling output of the component plant 5 is assisted by employing the nitrogen stream 9b that has been generated in the air fractionation 2 and expanded and simultaneously cooled in the turbine 20 for cooling of the coolant in the coolant circuit of the compression refrigeration plant 5. The nitrogen stream 9b that has been expanded and cooled in the turbine 20 is guided into the compression refrigeration plant 5, heated therein and guided as stream 9c to the cooling tower 6, in order to flow through the cooling tower together with the tail gas stream 10 from the air fractionation 2 and to cool the cooling water by evaporation. The nitrogen-tail gas mixture 17 laden with moisture in the cooling tower is discharged for further treatment outside the plant 1. From a plant outside the plant 1, which is not shown, cooling water 18a is supplied to the cooling tower 6, cooled therein and fed to the compression refrigeration plant 5 as stream 18b and thence discharged from the plant 1 as stream 18c.

Figure 2:
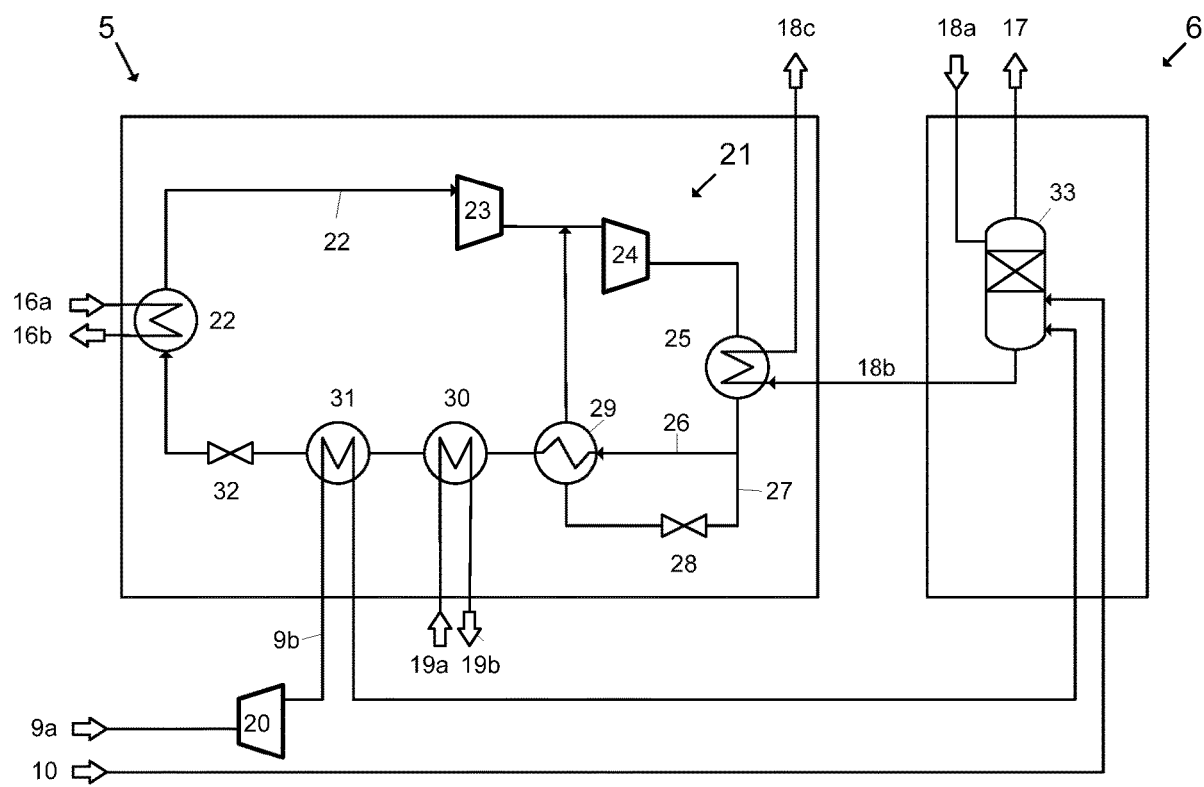
FIG. 2: method diagram of a compression coolant circuit with the inventive use of nitrogen and tail gas for cooling of the cooling water.

FIG. 2 shows the compression refrigeration plant 5 and evaporative cooling plant 6 components of the plant according to the invention. The coolant circulates in the compression coolant circuit 21. Frequently, the coolant used is ammonia or else propylene.

The coolant stream 22 is compressed in two stages in the series-connected compressors 23 and 24 and cooled by means of cooling water and partly condensed in heat exchanger 25. The coolant stream is then divided into streams 26 and 27. Stream 27 is expanded in valve 28, simultaneously cooled, and used for cooling of stream 26 in heat exchanger 29 and then recycled back into the main stream upstream of compressor 24. The coolant stream 26, after being cooled in heat exchanger 29, is cooled in heat exchanger 30 by the carbon dioxide stream 19a removed in the Rectisol plant 4, FIG. 1. The nitrogen stream 9a generated in the air fractionation 2, FIG. 1, is introduced, expanded in the turbine 20 and cooled. The nitrogen stream is then used as stream 9*b* in heat exchanger 31 for cooling of the coolant stream. Subsequently, the coolant stream is expanded in valve 32, simultaneously cooled further, and then used in heat exchanger 22 for cooling of the methanol absorbent 16*a*, *b*. From a supply unit which is not shown and is not part of the plant, cooling water 18*a* is introduced into the evaporative cooler 33 of the component plant 6. Likewise introduced into the evaporative cooler 33 is residual gas 10 from the air fractionation 2, FIG. 1, and the nitrogen stream 9*c*. These gases are laden with moisture, discharged from the plant as stream 17 and disposed of. The cooling water 18*b* that has been cooled in the evaporative cooler 33 is guided into the compression refrigeration plant 5, where it is used for cooling and condensation of the coolant in heat exchanger 25 and then discharged from the plant as stream 18*c*.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

INDUSTRIAL APPLICABILITY

The invention provides a way of lowering the expenditure of electrical energy in the production of synthesis gas that has been freed of acid gas. The invention is therefore industrially applicable.

LIST OF REFERENCE NUMERALS 1 method/plant according to the invention
2 low-temperature air fractionation
3 gasification
4 low-temperature absorption (Rectisol plant)
5 compression refrigeration plant
6 evaporative cooling plant
7 air
8 oxygen
9 nitrogen
10 tail gas
11 hydrocarbonaceous fuel
12 steam
13 crude synthesis gas, comprising acid gases
14 residue/ash
15 synthesis gas, free of acid gases
16 a, b methanol
17 nitrogen-tail gas mixture, laden with moisture
18 a, b, c cooling water
19 a, b carbon dioxide
20 turbine
21 compression coolant circuit
22 coolant stream
23 compressor
24 compressor
25 heat exchanger
26 coolant stream
27 coolant stream
28 valve
29 heat exchanger
30 heat exchanger
31 heat exchanger
32 valve
33 evaporative cooler

The invention claimed is:

1. A method of generating a synthesis gas which consists essentially of carbon monoxide and hydrogen and has been purified of acid gases, proceeding from a hydrocarbonaceous fuel, and also air and steam, the method comprising the steps of:
   a) fractionating air by low-temperature rectification to give an oxygen stream, a tail gas stream and a nitrogen stream, wherein the tail gas stream and the nitrogen stream are at ambient temperature and the nitrogen stream is at a pressure above ambient pressure;
   b) converting a hydrocarbonaceous fuel at a pressure above ambient pressure and a temperature above ambient temperature with the oxygen stream generated in step a) and the steam to a synthesis gas;
   c) removing the acid gases from the synthesis gas generated in step b) by low-temperature absorption in an absorption column with a liquid absorbent;
   d) cooling the absorbent used in step c) to the low temperature needed for the low-temperature absorption by means of a compression refrigeration plant, wherein the compression refrigeration plant comprises a coolant circuit in which a coolant is compressed and hence heated and is cooled and condensed by subsequent heat exchange with cooling water; and
   e) cooling the cooling water before it exchanges heat with the coolant in step d) by evaporative cooling,
   wherein the evaporative cooling in step e) is conducted with the tail gas stream generated in step a) and/or, after the tail gas stream has been expanded, with the nitrogen stream generated in step a).

2. Method according to claim 1, wherein the nitrogen stream generated in step a) is first expanded and contemporaneously cooled by means of a turbine, then used for cooling by heat exchange of the coolant in the coolant circuit of the compression refrigeration plant and then for evaporative cooling of the cooling water.

3. A plant for generation of synthesis gas, comprising:
   a) a first plant for fractionation of air using an air fractionation plant that works by the principle of cryogenic rectification under a pressure above ambient pressure, suitable for generating a stream of gaseous oxygen and a stream of gaseous nitrogen at a pressure above ambient pressure and ambient temperature, and a tail gas stream;
   b) a second plant for conversion of a carbonaceous fuel with a gasifying agent to give a synthesis gas comprising mainly hydrogen and carbon monoxide, wherein the first and second plant are connected such that the oxygen generated in the first plant can be added to the gasifying agent used in the second plant;
   c) a third plant for removal of the acid gases carbon dioxide and hydrogen sulfide from the crude synthesis gas generated in the second plant by absorption at low temperature with a liquid absorbent comprising methanol;
   d) a compression refrigeration plant, comprising a coolant selected from the group consisting of ammonia, propylene, and combinations thereof; and
   e) an evaporative cooler configured to cool cooling water.

4. The plant for generation of synthesis gas, as claimed in claim 3, further comprising an expansion turbine.

\* \* \* \* \*